Nov. 30, 1926.
J. F. BERNHARDT
1,608,576
SPRING HOLDING DEVICE FOR AUTOMOBILES
Filed August 6, 1925
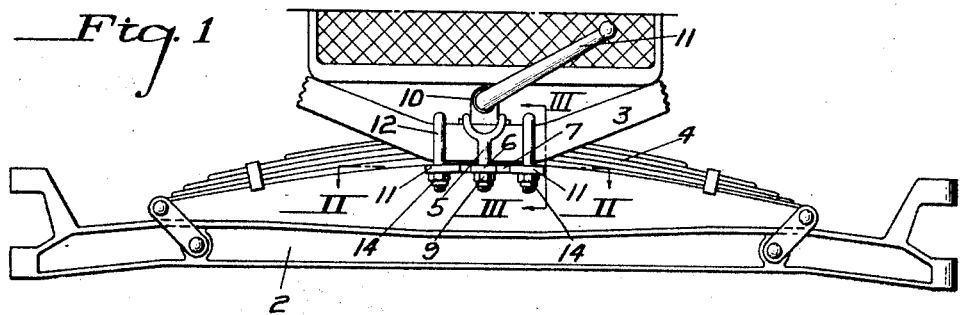
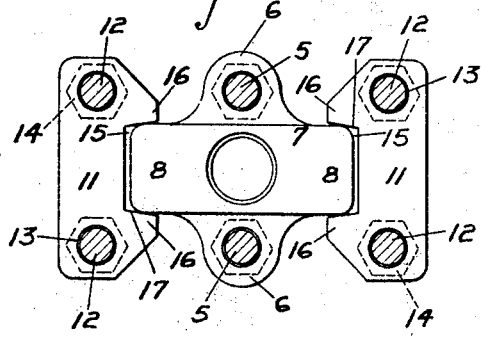
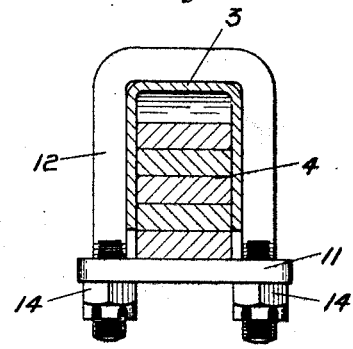
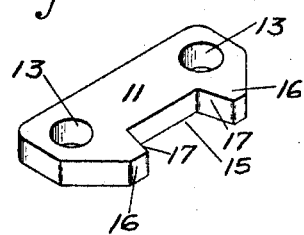
Joseph F. Bernhardt INVENTOR.
BY C. M. Clarke ATTORNEY.

Patented Nov. 30, 1926.

1,608,576

UNITED STATES PATENT OFFICE.

JOSEPH F. BERNHARDT, OF PITTSBURGH, PENNSYLVANIA.

SPRING-HOLDING DEVICE FOR AUTOMOBILES.

Application filed August 6, 1925. Serial No. 48,475.

My invention refers to an improvement in means for connecting the spring of an automobile to the supporting frame for the purpose of increasing the strength and stability of the structure, and supplementing the present connection, in a certain well known type of car.

The device consists of a pair of holding plates, so disposed and connected, as to effect the desired results, made and applied in the manner hereinafter described.

In the drawings:—

Figure 1 is a partial view in front elevation, showing the device as applied.

Figure 2 is an enlarged sectional view on line II—II of Fig. 1.

Figure 3 is a cross section on the line III—III of Fig. 1.

Figure 4 is a detail view showing one of the supplemental clamping plates.

While the invention is not limited to any particular make of car, it is particularly adapted to the standard Ford automobile, and is so illustrated.

In the drawings, 2 represents the axle of a Ford machine, between which and the engine supporting frame 3 is interposed the usual elliptic spring 4.

Frame 3 is mounted upon and embraces the middle thickest portion of the leaf spring 4 in a manner well understood, and is ordinarily connected therewith by a U shaped bolt 5. Said bolt extends downwardly at front and back through the lugs 6, 6, of a middle plate 7 which extends by its opposite ends 8, 8, at each side along underneath the spring, and is held by the usual nuts 9.

At its upper portion the U bolt 5 is usually bifurcated and extends around and embraces the top of frame 3, and embraces and fixedly supports the usual bearing 10 for the crank 11. As shown, the top and bottom of the middle portion of frame 3 are substantially horizontal, with which portions I have combined my improved supplemental clamping mechanism.

This consists of a pair of wedging plates 11, 11, which extend across underneath the spring at each side of the standard middle plate 7 and are firmly held in place by the U bolts or clevises 12.

The upper cross bars of bolts 12 tightly embrace the frame 3 and the bolt terminals extend through holes 13 in the front and back ends of plates 11, which are tightly clamped across the spring and bind the parts together by nuts 14. The inner confronting portions of plates 11 are provided with sockets 15 between extended lugs 16, 16, so as to engage the ends 8 of plate 7, as in Fig. 2. The inner faces 17 of said lugs are slightly flaring outwardly, so as to provide an inwardly tapering or wedging socket for engagement against the opposite ends of the plate. Such wedging action is effected upon tightening the nuts 14, due to the downwardly inclining under faces of the spring at each side, against which the upper faces of the plates 11 bear. Due to such conditions it will be seen that plates 11 may be snugly fitted and tightened against the parts, with supplemental tightening as the parts become worn, so as to firmly hold the spring and frame together, with great additional strength and security as compared with the single standard connection usually employed.

The advantages of the construction result in greatly increased strength and bracing connection between the spring and frame, with a corresponding bracing action against rocking or side swinging of the body. Breakage of the standard central connection, or undue straining of the parts is overcome and avoided, and the device obviates a common tendency towards weakness or rupture of these parts.

What I claim is:

1. The combination with a chassis frame and its spring provided with a connecting bolt and a bottom plate, of supplemental wedging plates engaging the opposite ends of the bottom plate and the under side of the spring and secured to the frame and spring.

2. The combination with a chassis frame and its spring provided with a connecting bolt and a bottom plate, of supplemental plates having wedging sockets engaging the ends of the bottom plate and secured to the frame and spring.

3. The combination with a chassis frame and its spring provided with a connecting bolt and a bottom plate, of supplemental plates having tapered sockets engaging the ends of the bottom plate and secured to the frame and spring.

4. In a Ford automobile provided with a central spring clamping plate and means connecting it with the spring and frame, a pair of supplemental wedging plates each having tapered socket engagement with the end of said plate, and means for holding them in place.

5. In a Ford automobile provided with a central spring clamping plate and means connecting it with the spring and frame, a pair of supplemental wedging plates each having tapered socket engagement with the end of said plate, and means for holding them in place against the under side of the spring.

6. A socket plate for the purpose described having inwardly tapering wedging lugs for engagement with the end of a Ford center plate, an upper face for engagement with the sloping under side of the spring, and clearance openings for a clamping bolt.

In testimony whereof I hereunto affix my signature.

JOSEPH F. BERNHARDT.